Patented Mar. 9, 1926.

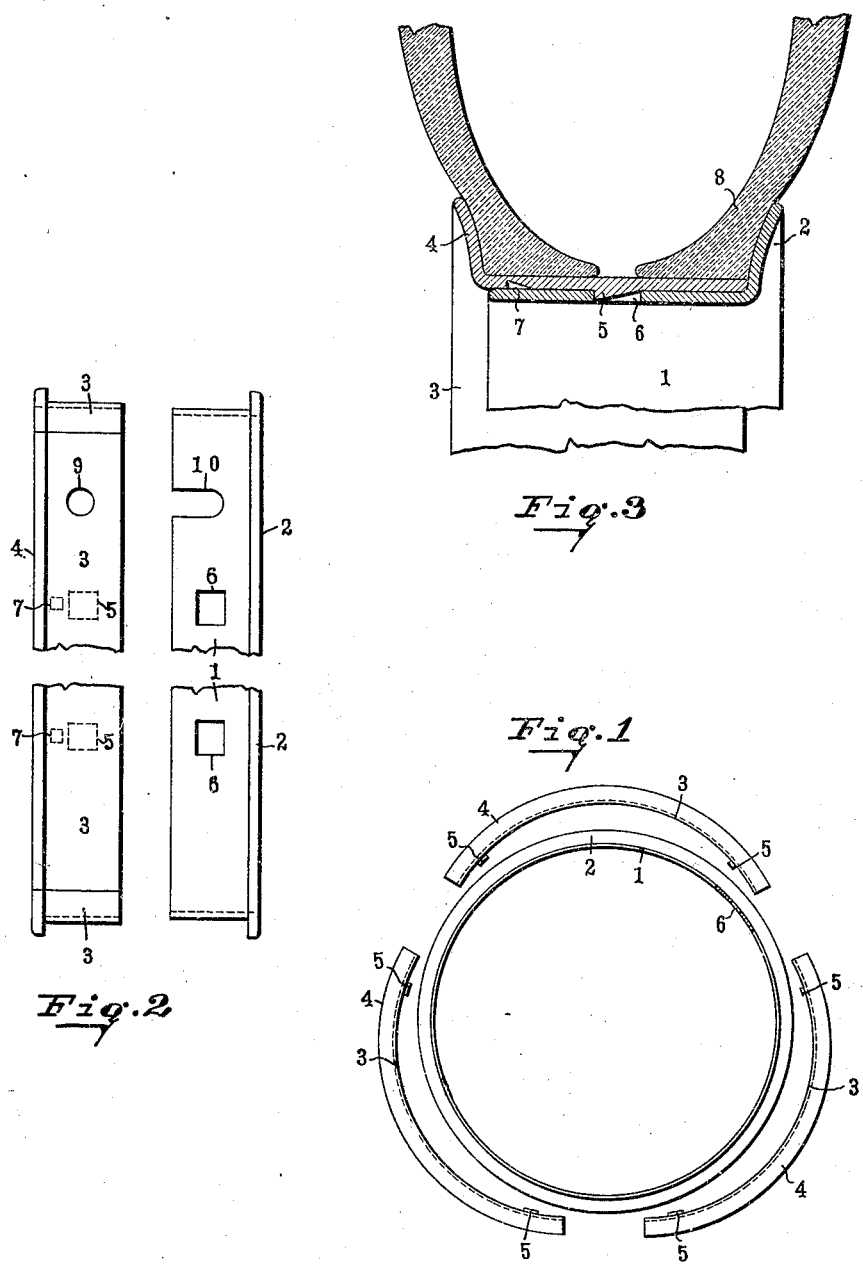

1,576,116

UNITED STATES PATENT OFFICE.

GEORGE S. GREENE AND LORENZ WEIHER, OF NEW YORK, N. Y.

RIM.

Application filed July 9, 1923. Serial No. 650,329.

*To all whom it may concern:*

Be it known that we, GEORGE S. GREENE and LORENZ WEIHER, citizens of the United States, both residing at New York, in the county of New York and State of New York, have invented certain new and useful Improvements in Rims, of which the following is a full, clear, and exact description, such as will enable other skilled in the art to which it appertains to make and use the same.

This invention relates to an improvement in rims and with respect to its more specific features to demountable or removable rims.

An object of the invention is to provide a rim of the class described, which may be quickly and easily assembled or disassembled.

Another object is to provide a rim which may be assembled in the tire and afterwards placed upon the wheel.

Another object is to provide a construction of sectional rim such that the normal usage of the wheel tends to tighten the sections of the rim with respect to each other.

Another object is to provide a two-part rim, wherein one of the parts is sectional and clamped between the other part and the tire.

Another object is to provide a two-part rim having one part sectional, wherein the pressure of the seated tire is utilized to clamp the parts together.

Other objects of the invention will be in part obvious and in part pointed out hereinafter.

The invention accordingly comprises the features of construction, combinations of elements, and arrangement of parts, which will be exemplified in the constructions hereinafter set forth and the scope of the application of which will be indicated in the claim.

For a fuller understanding of the nature and objects of the invention reference should be had to the following detailed description taken in connection with the accompanying drawing, in which:

Figure 1 is an edge view of the improved rim with the sections of the outer part separated, Fig. 2 is a plan view with the parts separated, Fig. 3 is a radial section of the rim.

In the present embodiment of the invention the improved rim is composed of two main parts, an inner rim, or rim part 1 which is annular, and an outer rim or rim part to be described, which is also annular in form when assembled, but is divided transversely into a plurality of arcuate rim sections. The part 1 is provided at one side edge with a marginal flange 2, which is adapted to engage and support one side of the tire. The outer rim part as mentioned is divided transversely into a plurality of similar arcuate rim sections 3 formed on an arc having the same radius as that of the rim part 1, and of such a length that when fitted in abutting relation with each other on the outside of the rim part 1, they will lie circumferentially relative to each other on said rim part 1 to form a complete substantially circular rim part. In the modification shown, there are three of these rim sections 3 which are hereinafter referred to as circumferential sections. As shown in Fig. 3, each of the circumferential sections is provided with an outwardly extending marginal flange 4 for contacting with the outer side of the tire and with an inwardly extending flange underlying and bearing against the inner surface of the surrounding tire for supporting the same. Each of the sections 3 is provided at one edge with a flange 4, and when the sections are assembled outside of the part 1, the flanges 4 will be substantially continuous, and will afford a support for the opposite side of the tire from the flange 2.

The parts are held together by the inflated tire and by lugs 5 on the sections 3, which engage openings 6 in the part 1. Two lugs 5 are preferably provided for each section, one of the lugs being located near each end of the section, and referring to Fig. 3, it will be seen that each lug has the face remote from the flange beveled or inclined, so that it will ride up over the part 2, and engage within the opening 6. The lugs 5 may be disengaged from the openings 6, by spreading the sections 3. Any suitable tool may be used for this purpose as for instance a screw driver which may be inserted between the parts 2 and 3, adjacent to a lug 5. When the parts are sufficiently separated to disengage the lug, the section of the part 3 may be slipped far enough to cause the lug to rest upon the outer face of the part 1, until the remaining lug is disengaged, should there be more than one lug to the section. In order to facilitate the disengagement of the parts, each section is provided adjacent to each lug 5 with a notch or curf 7, which is adapted to receive the end of the screw driver, to provide a purchase or fulcrum.

In assembling the improved rim the sections 3 are laid upon the ground in an approximate circle with the flanges 4 down. The deflated pneumatic tire 8 is dropped over the sections, so as to rest on one side thereof upon the flanges. The part 1 is now pushed into the tire, between the sections 3, and it is pushed down until the lugs 5 engage the openings 6. When now the tire is inflated, the sections 3 of the outer part of the rim are clamped tightly between the tire and the part 1, so that there is no possibility of accidental displacement, so long as the tire is inflated. Suitable openings may be provided in the part 1, and in a section or sections of the outer part for the passage of the inflating valve for the tire, the said openings being indicated at 9 and 10 respectively. The latter opening is a slot extending from the unflanged edge of the part 1, to facilitate the assembling of the rim and tire. It will thus be seen that the openings 9 and 10 cooperate to circumferentially position the rim parts to bring the respective lugs 5 and recesses 6 into proper position for registering. The inner rim 1, may or may not be a permanent part of the wheel.

Since certain changes may be made in the above construction and different embodiments of the invention could be made without departing from the scope thereof, it is intended that all matter contained in the above description or shown in the accompanying drawing shall be interpreted as illustrative and not in a limiting sense. The invention therefore is to be understood as embracing such equivalent modifications as fall fairly within the spirit and scope of the appended claim.

Having described our invention, what we claim as new and desire to secure by Letters Patent, is:

In a device of the character described, in combination, a tire supporting rim part including a plurality of circumferential sections adapted to abut end to end to form a complete outer rim part, said circumferential sections having inwardly extending circumferential flanges adapted to bear against the inner surface of a surrounding tire for supporting the same, and means including a circumferential rim part disposed inside of said circumferential flanges, whereby inwardly directed radial pressure of the surrounding tire retains the rim sections in tire supporting relation with each other.

In testimony whereof we affix our signatures.

GEORGE S. GREENE.
LORENZ WEIHER.